United States Patent [19]

Meinhard

[11] Patent Number: 4,856,636

[45] Date of Patent: Aug. 15, 1989

[54] APPARATUS FOR DAMPING FLUCTUATIONS OF TORQUE

[75] Inventor: Rolf Meinhard, Bühl/Baden, Fed. Rep. of Germany

[73] Assignee: Luk Lamellen und Kupplungsbau GmbH, Bühl, Fed. Rep. of Germany

[21] Appl. No.: 152,067

[22] Filed: Feb. 4, 1988

[30] Foreign Application Priority Data

Feb. 7, 1987 [DE] Fed. Rep. of Germany ....... 3703808

[51] Int. Cl.⁴ .................... F16F 15/12; F16F 15/30
[52] U.S. Cl. ........................ 192/70.17; 192/104 C;
192/106.2; 74/574; 464/68
[58] Field of Search ............ 192/70.17, 103 R, 104 C, 192/106 L; 74/574; 464/68

[56] References Cited

U.S. PATENT DOCUMENTS

| 2,746,587 | 5/1956 | Spase | 192/104 C |
| 3,026,979 | 3/1962 | Moore | 192/104 C |
| 3,037,600 | 6/1962 | Heckethorn | 192/104 C |
| 4,624,351 | 11/1986 | Lutz et al. | 192/104 C |
| 4,638,684 | 1/1987 | Maucher | 192/103 R |
| 4,739,866 | 4/1988 | Reik et al. | 192/70.17 |

FOREIGN PATENT DOCUMENTS 2171172 8/1986 United Kingdom ............ 192/106.2

Primary Examiner—Leslie A. Braun
Assistant Examiner—David A. Testardi
Attorney, Agent, or Firm—Peter K. Kontler

[57] ABSTRACT

Apparatus for damping fluctuations of torque in the power train between the engine and the variable-speed transmission of a motor vehicle has a first flywheel which is driven by the crankshaft of the engine, a second flywheel which is coaxial with the first flywheel and can transmit torque from the first flywheel to the shaft of the transmission in response to engagement of a friction clutch, at least one elastic damper which opposes rotation of the flywheels relative to each other, and at least one friction generating device which opposes rotation of the flywheels relative to each other within a lower range of speeds but is deactivated by centrifugal force when the speed rises above a preselected value. The friction generating device has a set of arcuate jaws which are radially movably mounted on the second flywheel and are biased radially inwardly by pairs of coil springs so that their concave internal surfaces normally contact the cylindrical peripheral surface of a drum which is mounted on the first flywheel. The bias of the springs is overcome by centrifugal force when the RPM of the flywheels reaches the preselected value.

20 Claims, 2 Drawing Sheets

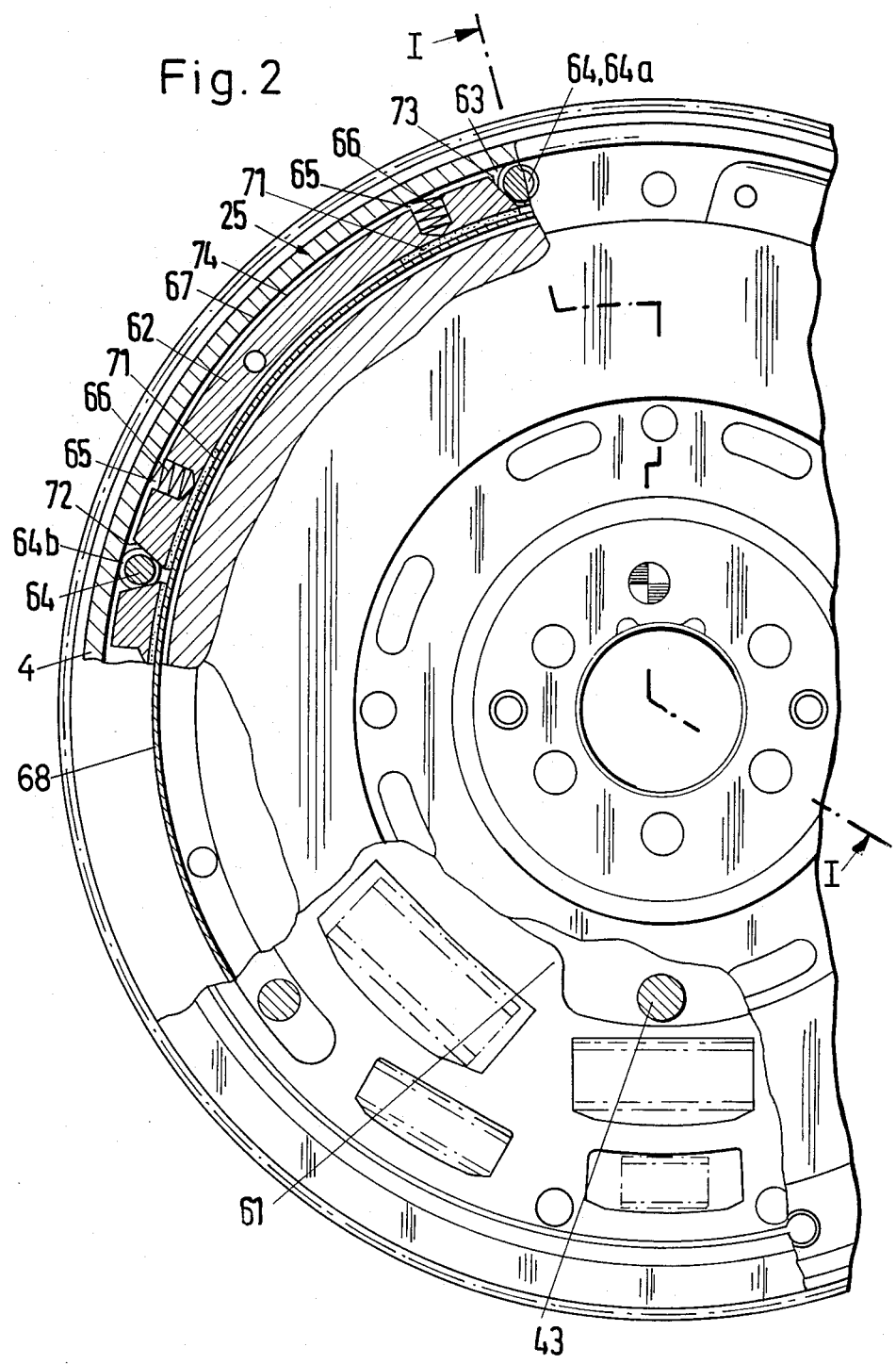

APPARATUS FOR DAMPING FLUCTUATIONS OF TORQUE

BACKGROUND OF THE INVENTION

The invention relates to apparatus for damping fluctuations of torque, and more particularly to improvements in apparatus wherein two rotary bodies can turn relative to each other against the opposition of elastic dampers and/or friction generating devices. Still more particularly, the invention relates to improvements in apparatus which can be utilized in motor vehicles to prevent or oppose fluctuations of torque which is transmitted between the engine and the variable-speed transmission.

It is known to provide the power train of a motor vehicle with a pair of flywheels one of which is driven by the crankshaft of the engine and the other of which can transmit torque to the input shaft of the variable-speed transmission, normally in response to engagement of a friction clutch. Reference may be had to numerous United States patents and pending United States patent applications, as well as to numerous foreign patents, of the assignee. It is also known to provide such power trains with dampers and/or friction generating devices which operate between the flywheels to oppose angular movements of the engine-driven flywheel relative to the other flywheel and/or vice versa. It is further known to provide such apparatus with friction generating devices which are operative while the flywheels are driven at a relatively low speed but cease to oppose, under the action of centrifugal force, angular movements of the flywheels relative to each other when the RPM rises beyond a preselected value.

OBJECTS AND SUMMARY OF THE INVENTION

An object of the invention is to provide a novel and improved apparatus wherein the friction generating means between the flywheels is simpler than but at least as reliable and at least as versatile as heretofore known friction generating means.

Another object of the invention is to provide an apparatus wherein the damping action is more satisfactory than in conventional apparatus.

A further object of the invention is to provide an apparatus which can be used in motor vehicles to effectively oppose fluctuations of torque transmission during starting or during turning off of the engine.

An additional object of the invention is to provide an apparatus which effectively prevents pronounced angular movements of one flywheel relative to the other flywheel during starting or stoppage of the engine and which can also prevent or effectively oppose angular displacements of the flywheels relative to each other while the engine is running.

A further object of the invention is to provide novel and improved friction generating means for use in the above outlined apparatus.

Still another object of the invention is to provide a simple and inexpensive apparatus which is of compact design, which can stand long periods of use, and which is not only highly reliable but also effective to prevent excessive fluctuations of torque transmission between the engine and the variable-speed transmission of a motor vehicle.

An additional object of the invention is to provide a power train which embodies the above outlined apparatus.

A further object of the invention is to provide a motor vehicle which embodies the above outlined apparatus.

Another object of the invention is to provide a novel and improved method of damping angular movements of two coaxial flywheels relative to each other.

The invention is embodied in an apparatus for damping fluctuations of torque, particularly for damping fluctuations of torque which is transmitted by the engine of a motor vehicle. The apparatus comprises a composite flywheel assembly including coaxial first and second flywheels which are rotatable relative to each other, at least one elastic damper which is operative to yieldably oppose rotation of the flywheels relative to each other, and at least one friction generating device which is operative to oppose rotation of the flywheels relative to each other with a first force within a lower (first) range of rotational speeds of the flywheels and with a lesser second force (e.g., with zero force) within a higher (second) range of rotational speeds of the flywheels. The friction generating device comprises a plurality of arcuate jaws which are radially movably mounted on one of the flywheels and have internal friction generating surfaces, and a brake drum provided on the other flywheel and having an external surface which confronts the internal surfaces of the jaws. The internal surfaces of the jaws are in frictional engagement with the external surface of the drum within the aforementioned first range of rotational speeds of the flywheels and are out of contact with the external surface as a result of joint radially outward movement of the jaws within the second range of rotational speeds.

The apparatus can be used with particular advantage to damp fluctuations of torque between the engine and a variable-speed transmission of a motor vehicle wherein the first flywheel receives torque from the engine (particularly by way of a crankshaft) and the second flywheel serves to transmit torque from the first flywheel to the input shaft of the transmission. The jaws can be radially movably mounted on the second flywheel and the drum is then provided on the first flywheel.

A friction clutch can be provided between the one flywheel and the variable-speed transmission, and such friction clutch comprises a clutch plate which drives the shaft of the variable-speed transmission when the clutch is engaged. The one flywheel has a side which faces away from the clutch plate of the friction clutch, and such one side of the one flywheel can be provided with a circumferentially extending groove for the jaws of the friction generating device.

Each jaw can be provided with two friction linings which are applied to the end portions of its internal surface to engage the external surface of the drum when the flywheels are driven to rotate within the aforementioned first range of speeds. The internal surfaces of the jaws preferably constitute portions of cylindrical surfaces and the external surface of the drum preferably constitutes a cylindrical surface. The external surface can be provided on a hollow cylindrical portion of the drum, and such cylindrical portion extends into the aforementioned circumferentially extending groove in one side of the one flywheel. A second portion of the drum preferably extends substantially radially of the flywheels and is riveted and/or otherwise secured to the other flywheel. In accordance with a presently preferred embodiment of the apparatus, the drum has a substantially L-shaped cross-sectional outline with the aforementioned hollow cylindrical portion extending axially of the flywheels and into the groove of the one flywheel, and with the aforementioned axially extending portion disposed between the two flywheels and permanently or removably affixed to the other flywheel.

The other flywheel can include a primary or main section which is attached to the crankshaft of the engine and a wall which defines with the primary section an annular chamber for a supply of viscous fluid and for the aforementioned damper. The radially extending portion of the drum is then affixed to the wall of the other flywheel.

The one flywheel can be provided with guide means for the end portions of the jaws; such guide means can include axially parallel guide elements in the form of pins or studs provided on the one flywheel and serving to confine the respective jaws to radial movements relative to the flywheels. The guide elements can be disposed in the aforementioned groove of the one flywheel. The end portions of the jaws can have substantially parallel surfaces. The guide means can further include stops which serve to limit axial movements of the jaws in a direction axially of the flywheels and toward the other flywheel.

The friction generating device further comprises means for yieldably biasing the jaws radially inwardly toward the drum so that the resistance of such biasing means must be overcome by centrifugal force when the flywheels are rotated within the second range of rotational speeds. The biasing means for each jaw preferably comprises first and second springs each of which engages one end portion of the respective jaw. Such springs preferably react against an inner surface which is provided in the groove of the one flywheel and surrounds the jaws. The springs can constitute coil springs each of which has a first end convolution bearing against the inner surface of the one flywheel and a second end convolution in a blind bore of the respective jaw. The blind bores are preferably provided in the end portions of the respective jaws.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary end elevational view of the apparatus as seen in the direction of arrow II in FIG. 1, with certain parts broken away.

DESCRIPTION OF THE PREFERRED EMBODIMENTS

Figure 1:
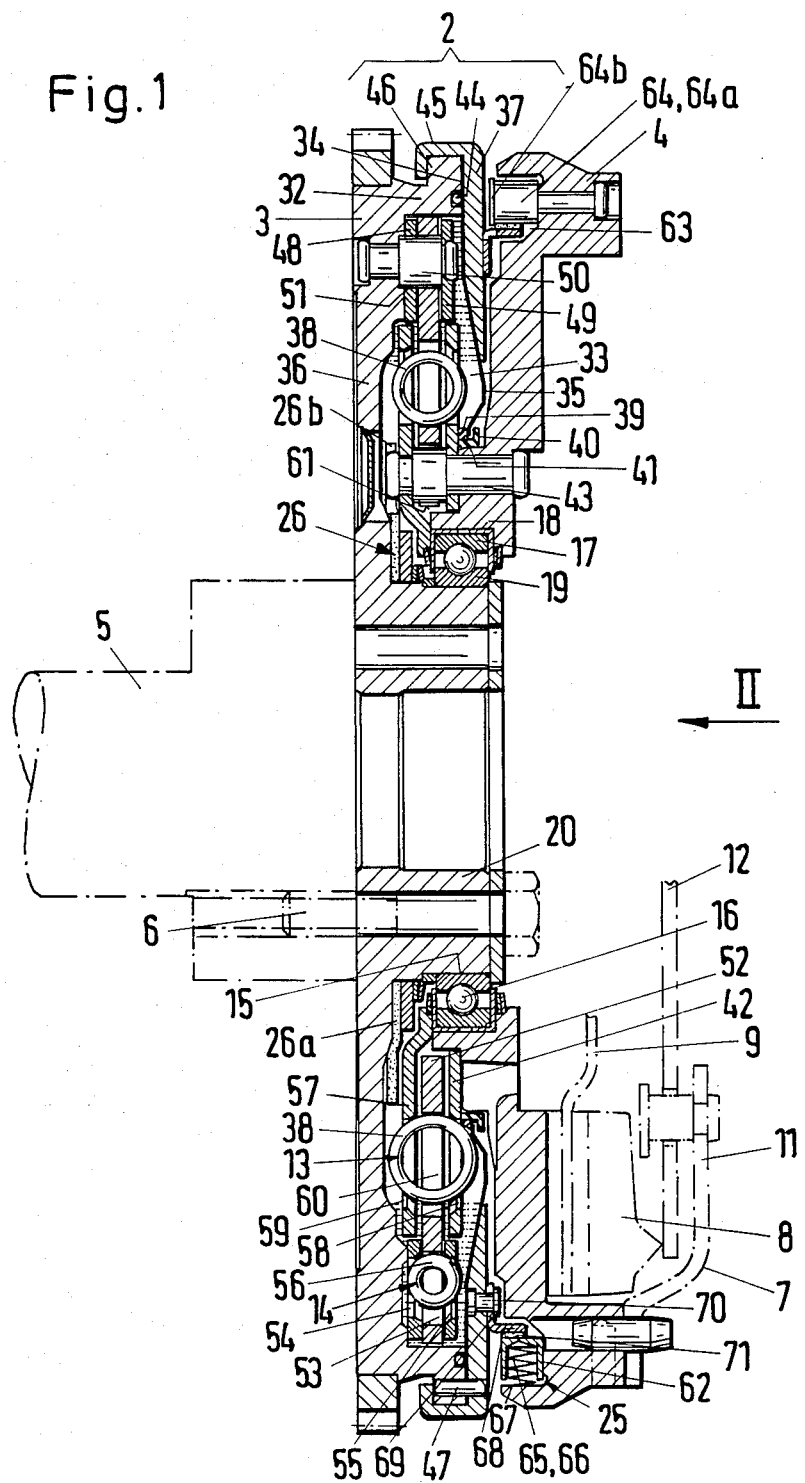
FIG. 1 is a composite axial sectional view of an apparatus which embodies one form of the invention, substantially as seen in the direction of arrows from line I-I of FIG. 2.

The apparatus which is shown in FIGS. 1 and 2 forms part of a power train between the internal combustion engine (not shown) and the variable-speed transmission (not shown) of a motor vehicle. It comprises a composite flywheel assembly 2 here shown as including a first rotary flywheel 3 whose main or primary section 36 is secured to the crankshaft 5 of the engine by an annulus or bolts 6 or other suitable fasteners, and a second rotary flywheel 4 which is coaxial with the flywheel 3, which can turn relative to the flywheel 3 (and vice versa), and which can transmit torque to the input shaft of the variable-speed transmission in response to engagement of a friction clutch 7.

The friction clutch 7 comprises a housing or cover 11 which is non-rotatably affixed to the flywheel 4, a pressure plate 8 which is non-rotatably but axially movably affixed to the cover 11, a clutch plate or clutch disc 9 which is interposed between the pressure plate 8 and the flywheel 4, and a diaphragm spring 12 which is tiltably mounted on the cover 11 and normally biases the pressure plate 8 against the clutch plate 9 so that the latter is clamped between and rotates with the parts 4, 8. The central portion of the clutch plate 9 has a hub (not specifically shown) which is non-rotatably affixed to the input shaft of the variable-speed transmission.

The apparatus of FIGS. 1 and 2 further comprises first and second elastic dampers 13 and 14 which are connected in series and serve to oppose angular movements of the flywheels 3 and 4 relative to each other. The resistance of the dampers 13, 14 can be overcome so that they permit at least some angular movements of the flywheels 3 and 4 relative to each other.

The section 36 of the flywheel 3 has an axial protuberance 20 which extends into an axial recess 18 of the flywheel 4. The protuberance 20 is surrounded by a bearing arrangement 15 including an antifriction ball bearing 16 with an inner race 19 on the protuberance 20, an outer race 17 in the recess 18, and at least one annulus of rolling elements between the races 17 and 19. The protuberance 20 extends axially in a direction away from the crankshaft 5 of the engine.

Still further, the apparatus comprises a first friction generating device 25 and a second friction generating device 26. In accordance with a feature of the invention, the friction generating device 25 is designed to oppose rotation of the flywheels 3, 4 relative to each other with a greater first force while the RPM of the flywheels is within a lower (first) range, and to oppose the rotation of the flywheels relative to each other with a lesser second force (particularly with zero force) when the RPM of the flywheels exceeds a preselected value at which the magnitude of centrifugal force suffices to deactivate the friction generating device 25. The friction generating device 26 is or can be designed to oppose any and all angular movements of the flywheels 3 and 4 relative to each other.

The main or primary section 36 of the flywheel 3 has a cylindrical extension 32 surrounding an annular chamber 33 which is filled with a supply of viscous fluid and accommodates the elastic dampers 13, 14 as well as the friction generating device 26. The extension 32 has an end face 34 which abuts a radially inwardly extending membrane 35 forming part of the flywheel 3 and bounding the respective side of the chamber 33. The membrane 35 directly overlies the end face 34 of the extension 32 and is in contact with the body of viscous fluid in the chamber 33. A sealing ring 44 (e.g., an O-ring) is recessed into the end face 34 of the extension 32 and is engaged by the membrane 35 under the action of a wall 37 which forms part of the flywheel 3 and includes a cylindrical radially outermost portion 45 surrounding an external flange 46 of the end wall 32 and a radially inwardly extending portion which overlies the left-hand side of the flange 46 (as seen in FIG. 1). The wall 37 extends inwardly along the outer side of the membrane 35 so that the latter is held against deformation in a direction toward the flywheel 4 in that region which is adjacent the dampers 13 and 14.

The viscous fluid in the chamber 33 is oil or grease, and the quantity of this fluid is or can be selected in such a way that, when the flywheels 3, 4 rotate and the fluid is acted upon by centrifugal force, it fills the radially outermost portion of the chamber 33 to a predetermined level, e.g., to a level such that at least a portion of each energy storing element 38 of the damper 13 is immersed in the fluid. The purpose of viscous fluid in the chamber 33 is fully disclosed in numerous United States patent application of the assignee of the present application.

The membrane 35 extends radially inwardly beyond the wall 37 and cooperates with two sealing devices 39, 40 to prevent escape of fluid from the chamber 33. The radially outermost portion of the chamber 33 is sealed by the O-ring 44. The sealing device 39 is a ring which engages the membrane 35 in such a way that the latter is stressed in the axial direction of the flywheels 3, 4. The sealing device 40 also constitutes a ring having an L-shaped cross-sectional outline and including an axially extending portion which is engaged by the sealing device 39. The flywheel 4 has a shoulder 41 which extends axially toward the flywheel 3 and is secured to the sealing device 40. The sealing devices 39, 40 and the shoulder 41 are located radially inwardly of the energy storing elements 38 of the damper 13 in the chamber 33. The radially extending portion of the sealing device 40 overlies the radially innermost portion of the membrane 35 opposite the sealing device 39. The latter abuts one side of a disc 42 which is affixed to the flywheel 4 adjacent the shoulder 41 by rivets 43.

The membrane 35 can be made of spring steel and it bears against the adjacent side of the wall 37. The wall 37 is at least substantially rigid (nonelastic) and takes up the stresses which are transmitted thereto by the membrane 35 while the latter tends to move away from the main or primary section 36 of the flywheel 3 when the apparatus is in use and the flywheels 3, 4 rotate so that the body of confined viscous fluid tends to move radially outwardly under the action of centrifugal force and urges the membrane 35 toward the flywheel 4. Excessive deformation of the radially inner and innermost portions of the membrane 35 can be avoided or prevented by selecting the quantity of viscous fluid in the chamber 33 in such a way that, when the flywheels 3 and 4 rotate, the fluid forms an annulus which does not extend (or does not extend appreciably) radially inwardly beyond the wall 37. Axially parallel pins 47 are installed in registering bores of the flange 46, membrane 35 and wall 37 to ensure that all parts of the flywheel 3 rotate as a unit. The pins 47 can constitute so-called heavy type dowel pins. They can form an annulus which is located radially outwardly of the O-ring 44 in the end face 34 of the extension 32.

The input element of the outer damper 14 comprises two discs 48, 49 which are spaced apart from each other in the axial direction of the flywheels 3, 4 and are non-rotatably affixed to the flywheel 3. Rivets 50 are provided to secure the disc 49 to the flywheel 3, and these rivets further serve to secure the disc 48 to the flywheel 3 in such a way that the disc 48 is movable axially toward and away from but cannot rotate with reference to the disc 49. To this end, the disc 48 has openings 51 which receive the adjacent portions of the rivets 50 in such a way that the disc 48 can move axially toward or away from the main section 36 of the flywheel 3, i.e., away from or toward the disc 49. The output element of the outer damper 14 is a disc-shaped flange 52 which is disposed between the discs 48, 49 of the input element. The flange 52 and the discs 48, 49 are respectively provided with registering windows 53, 54, 55 for energy storing elements 56 in the form of coil springs. These coil springs store energy when the discs 48, 49 turn relative to the flange 52 or vice versa.

The flange 52 constitutes the input element of the damper 13. The output element of this damper includes the aforementioned disc 42 and a second disc 57. The flange 52 is disposed between the discs 42, 57 and these discs are non-rotatably secured to the flywheel 4 by the aforementioned rivets 43 in such a way that they are held at a given axial distance from each other. The discs 42, 57 and the flange 52 are respectively provided with closed windows 58, 59, 60 for the aforementioned energy storing elements 38 of the damper 13. Each of these energy storing elements constitutes a coil spring which is caused to store energy in response to rotation of the flange 52 relative to the discs 42, 57 and/or vice versa. The rivets 43 are located radially inwardly of the energy storing elements 38.

The radially innermost portion of the flange 52 is provided with projections in the form of teeth 61 which alternate with the rivets 43. The clearances between the teeth 61 and the adjacent rivets 43 determine the extent of angular movability of the flange 52 with reference to the flywheel 4 and hence the range of operation of the damper 13 in the circumferential direction of the flywheels.

The friction generating device 26 operates in parallel with the elastic damper 14 and serves to generate friction which opposes angular movements of the flywheels 3 and 4 relative to each other. A friction disc 26a of the device 26 is adjacent the section 36 of the flywheel 3 and has slots or otherwise configurated apertures 26b for the heads of the rivets 43. The arrangement is preferably such that the heads of the rivets 43 extend into the respective apertures 26b with at least some play in the circumferential direction of the flywheels 3, 4 so that the device 26 becomes effective with a certain delay following initial angular displacement of the flywheel 3 relative to the flywheel 4. The friction disc 26a operates between the section 36 of the flywheel 3 and a washer (not referenced) which rotates with the flywheel 3 and is biased against the radially innermost portion of the disc 26a by one or more diaphragm springs reacting (directly or indirectly) against the inner race 19 of the antifriction bearing 16 (i.e., against the protuberance 20 of the flywheel 3).

The friction generating device 25 is arranged to be effective during one or more predetermined stages of operation of the engine, especially during starting and stoppage when the RPM of the flywheels 3, 4 is below the idling RPM. During these stages of operation, the flywheels 3 and 4 are likely to tend to turn relative to each other through relatively large angles which could entail pronounced fluctuations of torque transmission between the engine and the variable-speed transmission. The friction generating device 25 is a damper which is designed to generate frictional hysteresis directly between the flywheels 3, 4 at least while the RPM of the flywheels 3, 4 is within the critical range.

FIG. 2 shows that the friction generating device 25 comprises a set of arcuate brake shoes or jaws 62. These jaws together form an annulus which is disposed in a circumferentially complete groove 63 machined into or otherwise formed in that side of the flywheel 4 which faces away from the clutch plate 9 of the friction clutch 7 and being open toward the wall 37 of the flywheel 3. The jaws 62 are movable radially of the flywheel 4 but are held against movement in the circumferential direction of the flywheels by guide means including discrete guide elements 64 in the form of axially parallel pins or studs each of which can resemble or constitute a rivet and is anchored in the flywheel 4 so that it is located in the groove 63 and is flanked by the neighboring jaws 62. The shanks 64a of the guide elements 64 constitute short cylinders which are adjacent the respective end surfaces of neighboring jaws 62 and carry heads 64b which constitute stops serving to prevent or limit axial movements of the jaws 62 toward the flywheel 3, i.e., out of the groove 63 of the flywheel 4. The end surfaces 72, 73 of the jaws 62 preferably slide along the cylindrical portions 64a of the guide elements 64 when the jaws are caused to move radially of the flywheel 4, either under the action of centrifugal force or under the action of biasing means each of which includes a pair of coil springs 66. When the jaws 62 tend to move with reference to (namely in the circumferential direction of) the flywheel 4, the guide elements 64 transmit the thus generated forces to the flywheel 4.

The end portions of the jaws 62 are formed with radially extending blind bores 65 which are open in the regions of the external surfaces 74 of the jaws and each of which receives the inner portion of one of the coil springs 66. These coil springs bear against the surfaces at the bottoms of the respective blind bores 65 to urge the jaws 62 radially inwardly, and their outermost convolutions react against a cylindrical inner surface 67 of the flywheel 4. The surface 67 is provided in the groove 63.

The internal surfaces of the jaws 62 constitute portions of cylindrical surfaces and their end portions carry friction linings 71 which are urged against the cylindrical external surface of the hollow cylindrical portion 68 of a brake drum 69 which is secured to the flywheel 3 (namely to the wall 37) by a set of rivets 70 or other suitable fasteners. The coil springs 66 are installed in their blind bores 65 in prestressed condition so that they invariably urge the friction linings 71 against the cylindrical external surface of the drum portion 68. The drum 69 has a substantially L-shaped cross-sectional outline with one leg constituted by the cylindrical portion 68 and with another leg constituted by a radially inwardly extending washer-like portion which is riveted to the wall 37. The cylindrical portion 68 is located in the groove 63 of the flywheel 4 radially inwardly of the set of jaws 62.

The pairs of friction linings 71 can be replaced with one-piece friction linings which overlie the entire internal surfaces of the respective jaws 62.

In order to ensure satisfactory guidance of the jaws 62 during their movement radially of the flywheel 4, the end surfaces 72, 73 of the jaws (next to the guide elements 64) are preferably parallel to each other. If desired, the stops 64b of the guide elements 64 can be replaced with other suitable means for preventing the jaws 62 from leaving the groove 63 of the flywheel 4.

The initial stressing of the coil springs 66 is or can be selected in such a way that a frictional hysteresis develops directly between the flywheels 3 and 4 (in that the friction linings 71 bear against the cylindrical external surface of the cylindrical portion 68 of the drum 69) at least within that RPM range of the flywheels 3, 4 which is below the idling RPM of the engine. The arrangement may be such that the centrifugal force acting upon the jaws 62 against the opposition of the coil springs 66 suffices to disengage the friction linings 71 from the cylindrical portion 68 of the drum 69 shortly before the engine reaches the idling RPM following starting or following acceleration from a lower rotational speed. The coil springs 66 then store energy and are free to dissipate such energy (in order to return the jaws 62 into frictional engagement with the drum 69) when the friction generating device 25 is to reestablish frictional hysteresis between the flywheels 3 and 4, i.e., when the RPM of the flywheels 3, 4 is reduced from a higher range to a lower range below a predetermined value at which the device 25 becomes (a) effective if the RPM decreases or (b) ineffective if the RPM increases. When the RPM of the flywheel 4 reaches or exceeds a preselected value, the coil springs 66 are or can be stressed to such an extent that the external surfaces 74 of the jaws 62 actually contact the inner surface 67 of the flywheel 4.

When the engine is turned off or when the RPM of the flywheels 3, 4 decreases below the aforementioned predetermined value, the magnitude of centrifugal force decreases and the springs 66 are free to expand so that the friction linings 71 return into engagement with the external surface of the cylindrical portion 68 of the drum 69. This can take place when the RPM of the flywheel 4 equals or approximates the idling RPM of the engine. Frictional hysteresis between the flywheels 3 and 4 increases proportionally with decreasing RPM of the flywheel 4 (i.e., with decreasing centrifugal force) so that the device 25 offers a progressively increasing resistance to rotation of the flywheels 3 and 4 relative to each other as the RPM of the flywheels continues to decrease below the idling RPM of the engine.

An important advantage of the friction generating device 25 is that the jaws 62 cooperate with the drum 69 to offer a pronounced resistance to rotation of the flywheels 3, 4 relative to each other when the RPM of the engine is below the idling speed or whenever the RPM of the engine (and hence of the flywheels 3 and 4) drops below a predetermined value. This ensures that the flywheels 3, 4 are highly unlikely to oscillate relative to each other within the aforementioned lower or first speed range. The friction generating device 25 ensures that, when the RPM of the flywheels 3, 4 drops to or below the predetermined value, the system is out of tune in that the characteristic frequency of the system is shifted into an RPM range which is very narrow or which cannot be reached at all during any stage of operation of the engine.

The jaws 62 can be mounted on the flywheel 3, and the drum 69 is then mounted on the flywheel 4. It is preferred to mount the jaws 62 on the flywheel 4 when the latter is installed in the power train of a motor vehicle so that it is adjacent the friction clutch 7. The placing of jaws 62 and of cylindrical portion 68 of the drum 69 into the groove 63 at that side of the flywheel 4 which faces away from the clutch plate 9 of the friction clutch 7 contributes to compactness of the apparatus, especially in the axial direction of the flywheels 3, 4 because, with the exception of the relatively thin radially extending portion of the drum 69, the entire friction generating device 25 is confined in the groove 63.

The provision of pairs of friction linings 71 at the ends of the internal surfaces of the jaws 62 renders it possible to determine and maintain a preselected maximum frictional torque which is transmitted between the jaws 62 and the drum 69. For example, the linings 71 can be secured to the respective jaws 62 by means of a suitable adhesive. The linings 71 can be omitted if the jaws 62 are made of a suitable friction generating material which comes in direct contact with the cylindrical external surface of the drum portion 68 when the coil springs 66 are free to expand so as to maintain the external surfaces 74 of the jaws out of contact with the inner surface 67 of the flywheel 4. For example, the jaws 62 can be made of a sintered material. It suffices if only certain parts of the internal surfaces of the jaws 62 resemble portions of cylindrical surfaces; for example, it suffices if the end portions (which carry the friction linings 71) resemble parts of a cylindrical surface which is complementary to the cylindrical external surface of drum portion 68.

It is possible to reduce the number of jaws 62 or to employ relative short arcuate jaws so that they do not form a substantially complete ring. However, the illustrated arrangement is preferred because the area of contact between the concave internal surfaces of the jaws 62 and the cylindrical external surface of the drum portion 68 is as large as possible, i.e., the combined area of the internal surfaces of jaws 62 is only slightly smaller than the area of the external surface of the portion 68.

The inclination of the end surfaces 72, 73 of each jaw 62 is preferably selected in such a way that these surfaces are parallel to an imaginary line which connects the common axis of the flywheels 3 and 4 with the center of the respective jaw (as measured in the circumferential direction of the flywheel 4).

The means for biasing the jaws 62 radially inwardly toward the drum 69 need not necessarily comprise coil springs 66; for example, such biasing means can comprise coil springs plus otherwise configurated springs without departing from the spirit of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping fluctuations of torque, particularity for damping fluctuations of torque which is transmitted by the engine of a motor vehicle, comprising a composite flywheel assembly including coaxial first and second flywheels which are rotatable relative to each other; at least one elastic damper which is operative to yieldably oppose rotation of said flywheels relative to each other; and at least one friction generating device operative to oppose rotation of said flywheels relative to each other with a first force within a lower range of rotational speeds of said flywheels and with a lesser second force within a higher second range of rotational speeds of said flywheels, said friction generating device comprising a plurality of arcuate jaws radially movably mounted on one of said flywheels and having internal friction generating surfaces, and a brake drum provided on the other of said flywheels and having an external surface confronting said internal surfaces, said internal surfaces being in frictional engagement with said external surface within said first range of rotational speeds and being out of contact with said external surface under the action of centrifugal force within said second range of rotational speeds, said other flywheel including a primary section which is arranged to receive torque from the engine of the motor vehicle and a wall defining with said primary section an annular chamber for a supply of viscous fluid, said damper being installed in said chamber.

2. The apparatus of claim 1 for damping fluctuations of torque between the engine and a variable-speed transmission of a motor vehicle, wherein said first flywheel receives torque from the engine by way of a crankshaft and said second flywheel is arranged to transmit torque to the transmission, said jaws being radially movably mounted on said second flywheel and said drum being provided on said first flywheel.

3. The apparatus of claim 1, further comprising a friction clutch which is engageable to receive torque from said one flywheel and includes a clutch plate, said one flywheel having a side facing away from said clutch plate and provided with a groove for said jaws.

4. The apparatus of claim 1, wherein each of said internal surfaces has two portions which are spaced apart from each other in the circumferential direction of said one flywheel, each of said jaws having friction linings defining said portions of its internal surface.

5. The apparatus of claim 1, wherein said internal surfaces constitute portions of cylindrical surfaces.

6. The apparatus of claim 1, wherein said external surface is a cylindrical surface.

7. The apparatus of claim 1, wherein said drum includes a cylindrical portion and said external surface is provided on said cylindrical portion.

8. The apparatus of claim 7, wherein said drum further comprises a second portion extending substantially radially of said flywheels and affixed to said other flywheel.

9. The apparatus of claim 1, wherein said drum has a substantially L-shaped cross-sectional outline and includes a cylindrical portion provided with said external surface and a radially extending portion affixed to said other flywheel.

10. The apparatus of claim 1, wherein said one flywheel has a circumferential groove for said jaws and said drum includes a portion provided with said external surface and extending into said groove.

11. The apparatus of claim 1, wherein said drum has a substantially L-shaped cross-sectional outline and includes a substantially cylindrical portion which is provided with said external surface and a substantially radially extending portion which is affixed to said wall.

12. The apparatus of claim 1, wherein each of said jaws has first and second end portions which are spaced apart from each other in the circumferential direction of said one flywheel, said one flywheel having guide means adjacent to the end portions of said jaws and arranged to confine said jaws to substantially radial movements relative to said one flywheel.

13. The apparatus of claim 12, wherein said one flywheel has a circumferentially extending groove for said jaws and said guide means include axially parallel guide elements provided in said groove.

14. The apparatus of claim 12, wherein the end portions of said jaws have substantially parallel surfaces.

15. The apparatus of claim 12, wherein said guide means include stops for limiting the extent of movability of said jaws in a direction toward said other flywheel.

16. The apparatus of claim 1, wherein said friction generating device further comprises means for yieldably biasing said jaws radially inwardly toward said drum.

17. The apparatus of claim 16, wherein each of said jaws comprises two end portions which are spaced apart from each other in the circumferential direction of said flywheels, said biasing means including first and second springs for each of said jaws, each of said springs being in engagement with one end portion of the respective jaw.

18. The apparatus of claim 16, wherein said one flywheel has a circumferentially extending groove for said jaws and an inner surface provided in said groove radially outwardly of said jaws, each of said biasing means comprising at least one spring which reacts against said inner surface and bears against one of said jaws.

19. The apparatus of claim 16, wherein said biasing means includes at least one spring for each of said jaws, each of said jaws having a blind bore for a portion of the respective spring.

20. The apparatus of claim 16, wherein each of said jaws has a first and a second end portion, said end portions being spaced apart from one another in the circumferential direction of said one flywheel and each of said end portions having a blind bore, said biasing means comprising a pair of coil springs for each of said jaws and each coil spring having a portion received in one blind bore of the respective jaw.

* * * * *